(12) United States Patent
Tzeng et al.

(10) Patent No.: US 8,190,766 B2
(45) Date of Patent: May 29, 2012

(54) ACROSS-DEVICE COMMUNICATION PROTOCOL

(75) Inventors: Shrjie Tzeng, Fremont, CA (US); Yi-Hsien Hao, Saratoga, CA (US)

(73) Assignee: Broadcom Corporation, Irvine, CA (US)

( * ) Notice: Subject to any disclaimer, the term of this patent is extended or adjusted under 35 U.S.C. 154(b) by 2941 days.

(21) Appl. No.: 10/163,361

(22) Filed: Jun. 7, 2002

(65) Prior Publication Data
US 2003/0212815 A1 Nov. 13, 2003

Related U.S. Application Data

(60) Provisional application No. 60/378,667, filed on May 9, 2002.

(51) Int. Cl.
*G06F 15/173* (2006.01)
(52) U.S. Cl. .................................................. 709/236
(58) Field of Classification Search .......... 370/248–463, 370/503; 709/212, 230–237
See application file for complete search history.

(56) References Cited

U.S. PATENT DOCUMENTS

| | | | | |
|---|---|---|---|---|
| 4,597,077 A * | 6/1986 | Nelson et al. | ................. | 370/352 |
| 4,679,191 A * | 7/1987 | Nelson et al. | ................. | 370/355 |
| 4,726,013 A * | 2/1988 | Kawashima et al. | ......... | 370/360 |
| 4,945,548 A | 7/1990 | Iannarone et al. | | |
| 5,278,789 A | 1/1994 | Inoue et al. | | |
| 5,517,499 A * | 5/1996 | Gauffin et al. | ................. | 370/503 |
| 5,555,398 A | 9/1996 | Raman | | |
| 5,619,497 A * | 4/1997 | Gallagher et al. | ............ | 370/394 |
| 5,825,768 A * | 10/1998 | Kimbrow et al. | ............. | 370/341 |
| 5,898,687 A | 4/1999 | Harriman et al. | | |
| 5,907,566 A | 5/1999 | Benson et al. | | |
| 5,948,060 A * | 9/1999 | Gregg et al. | .................. | 709/212 |
| 6,003,064 A * | 12/1999 | Wicki et al. | .................... | 709/200 |
| 6,111,889 A * | 8/2000 | Osada | ............................ | 370/461 |
| 6,122,286 A * | 9/2000 | Haas | ............................. | 370/462 |
| 6,175,902 B1 | 1/2001 | Runaldue et al. | | |
| 6,523,058 B1 * | 2/2003 | Fung et al. | .................... | 718/100 |
| 6,768,721 B1 * | 7/2004 | Schmitz et al. | ............... | 370/248 |
| 7,039,118 B1 * | 5/2006 | Segaram | ....................... | 375/257 |
| 7,154,915 B1 * | 12/2006 | Ushirokawa et al. | ......... | 370/528 |
| 2002/0018259 A1* | 2/2002 | Hait | ............................. | 359/123 |
| 2002/0064135 A1* | 5/2002 | Chen et al. | .................... | 370/252 |
| 2002/0105966 A1* | 8/2002 | Patel et al. | .................... | 370/463 |

FOREIGN PATENT DOCUMENTS

| | | | |
|---|---|---|---|
| JP | 63015351 A * | 1/1988 | |
| WO | WO 01/93052 A2 | 12/2001 | |
| WO | WO 01/95565 A2 | 12/2001 | |

OTHER PUBLICATIONS

Morton et al., High Speed Optoelectronic Sources for Multi-gigabit communication links, Lasers and Electro-Optics Society Annual Meeting, 1994, LEOS '94 Conference Proceedings, vol. 1, Oct. 31-Nov. 3, 1994, pp. 33-34.*

* cited by examiner

*Primary Examiner* — Larry Donaghue

(57) ABSTRACT

A method for communicating data between network devices is disclosed. A transmission signal is sent over a port of one of the network devices, where the port is in communication with other network devices of the network devices. A data frame is also sent over the port. The transmission signal and the data frame are sent for a fixed byte time period and at least one idle pattern is included with the data frame when a time required to send all data present is less than the fixed byte time period.

20 Claims, 3 Drawing Sheets

ACROSS-DEVICE COMMUNICATION PROTOCOL

REFERENCE TO RELATED APPLICATIONS:

This application claims priority of U.S. Provisional Patent Application Serial No. 60/378,667, filed on May 9, 2002. The contents of the provisional application is hereby incorporated by reference.

BACKGROUND OF THE INVENTION

1. Field of Invention

The field of the present invention is network devices that allow for data to be received and transmitted on a network. More specifically, the present invention is directed to network devices that may be chained together to provide higher port densities and to low-cost network devices. The present invention relates to a method and an apparatus for across-device communications. This across-device communication allows for the network devices to act as one switch assembly and allows for data to be received, examined and transmitted to the appropriate destinations.

2. Description of Related Art

Many types of network devices are necessary to allow a network to function properly. One such network device is commonly referred to as a switch. A switch is defined as a network component that receives incoming data, stores the data temporarily, and sends the data back out another port. The switch determines a destination address from the incoming data and sends the data to a port or ports associated with the destination address. In order to achieve higher port densities, multiple network devices or switches may be tied together. For example, suppose a particular chip housing the switch has an 8 fast Ethernet ports and 2 gigabit ports. In order to provide a switch assembly with a greater port density, perhaps having 16+4, or 24+6 or 36+8 port system, two, three or four chips, respectively, must be interconnected to provide such functionality. As such, many switches also have at least one expansion port so that multiple chips can be chained together.

One option that may be used for cross chip communication is using what is known as SerDes as the physical layer media. SerDes is a module that provides fast serial communication between two chips, where SerDes stands for serialization/deserialization. However, there are several problems associated with using SerDes to provide the cross chip communication required. First, when used with a standard interface, it is difficult to provide the required throughput to achieve the bandwidth needed for line speed switching. Second, because of the required inter packet gap (IPG), more channels of the SerDes must be devoted to inter-chip communication to achieve the required throughput.

Thus, there is a need for a mechanism in network devices that allows for across device communication that can be achieved through a relatively low cost solution. Additionally, while use of SerDes could provide a low cost solution, it was several drawbacks that do not allow for communication of the necessary speeds to be achieved through Serdes modules. Also, a protocol is needed to provide such across chip communication, such that the network devices can be interconnected and achieve the port density, without adding additional overhead.

SUMMARY OF THE INVENTION

It is an object of this invention to overcome the drawbacks of the above-described conventional network devices and methods. In the present invention, the network devices act as if it were transmitting a frame across chip continuously. Thus, even when there is no frame data to transmit across chip, the transmission signal will still be asserted and an idle pattern will be attached in the transmission field. This approach solves both the bandwidth and the minimum frame requirement associated with using SerDes in inter chip communications.

According to one aspect of this invention, a method for communicating data between network devices is disclosed. A transmission signal is sent over a port of one of the network devices, where the port is in communication with other network devices of the network devices. A data frame is also sent over the port. The transmission signal and the data frame are sent for a fixed byte time period and at least one idle pattern is included with the data frame when a time required to send all data present is less than the fixed byte time period.

The method can also include sending a transmission clock over the port wherein the transmission clock is used to determine when the fixed byte time period has elapsed. Additionally, the fixed byte time period may be a 512, 1024, or 2048 byte time period. Also, the method can also provide an effective bandwidth across the network devices of approximately 1 Gigabit per second. In addition, the transmission signal and data frame may be sent through a Gigabit media independent interface or through a SerDes module that takes a signal from the Gigabit media independent interface and transfers the signal into a differential pair signal.

In another aspect of the present invention, a network device capable of communicating data between other network devices is disclosed. The device includes at least one data port interface, supporting at least one data port transmitting and receiving data, at least one media access controller in communication with the plurality of data port interfaces and a SerDes module, that receives a signal from the at least one media access controller and transfers the signal into a differential pair signal. The at least one media access controller is configured to employ a Gigabit media independent interface and the at least one media access controller and the SerDes module are configured to send a data frame for a fixed byte time period, where the data frame may include at least one idle pattern when a time required to send all data present is less than the fixed byte time period.

Additionally, the plurality of data port interfaces may be a first set of data port interfaces and a second data port interfaces, where the first and second sets of data port interfaces support transmitting and receiving data at different rates. Also, the SerDes module may have four channels, with each of the four channels receives a digital signal and transfers the digital signal into a differential pair signal. Also, the network device may also have at least one of a packet buffer, an address management module and a serial management module.

These and other objects of the present invention will be described in or be apparent from the following description of the preferred embodiments.

BRIEF DESCRIPTION OF THE DRAWINGS

For the present invention to be easily understood and readily practiced, preferred embodiments will now be described, for purposes of illustration and not limitation, in conjunction with the following figures.

DETAILED DESCRIPTION OF PREFERRED EMBODIMENTS

Although the present invention may be applied to many types of switches, the examples presented here are made with respect to a particular type of switch. In one embodiment of the present invention, an 8+2 switch, i.e. having 8 fast Ethernet ports and 2 Gigabit Ethernet ports, has the capacity to be connected to other similar switches. A functional block diagram illustrating some aspects of such a switch is provided in FIG. 1. Packet data can be received or transmitted through the 10/100 transceiver 107 connected to the 10/100 Media Access Controller (MAC) 106 in the case of the 8 fast Ethernet ports and through the 10/100/1000 Physical Layer (PHY) 108 and the Gigabit Media Access Controller (GMAC)/MAC 101 modules in the case of the 2 gigabit Ethernet ports. The SerDes module 109 has its own SerDes GMAC 102 that facilitates communication through the SerDes module.

Figures 2A, 2B:
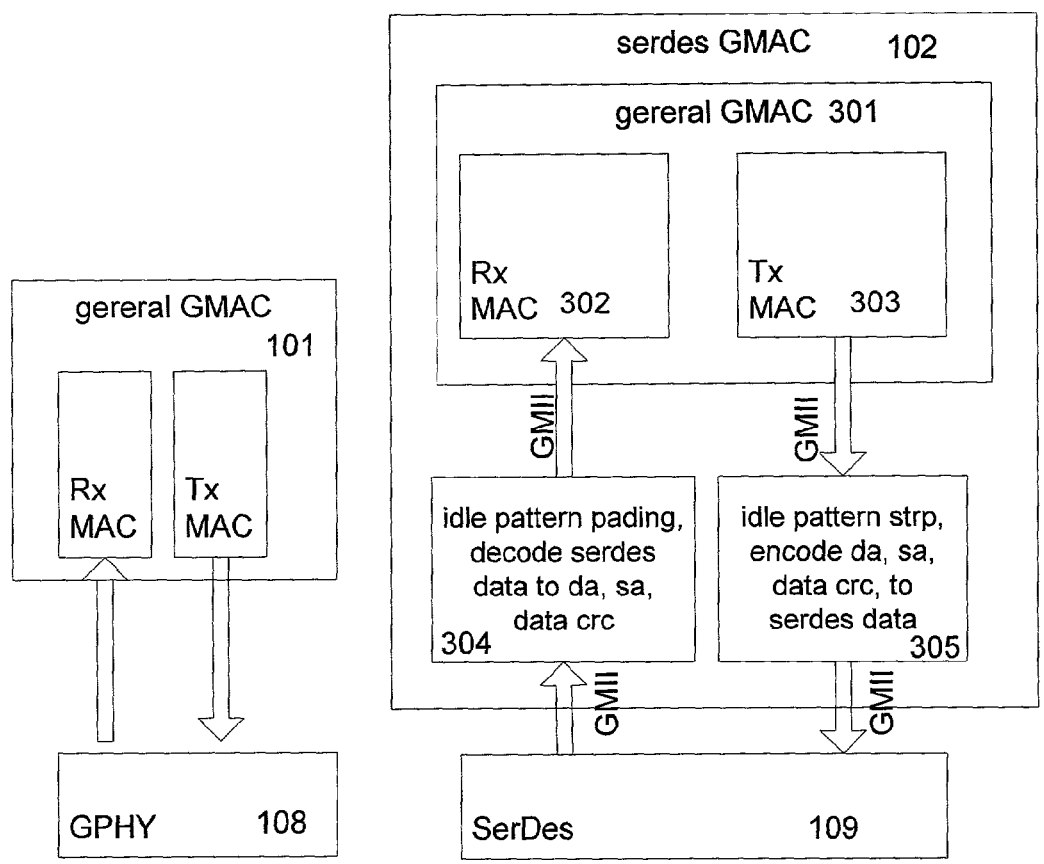
FIG. 2(a) illustrates a functional block diagram of the general Gigabit Media Access Controller (GMAC) and FIG. 2(b) illustrates a functional block diagram of the SerDes GMAC.

It should be noted that the general and SerDes GMACs have different structures and function differently. Both GMACs are illustrated in FIG. 2. FIG. 2(a) illustrates the general GMAC 101, having a transmit MAC and a receive MAC that communication with the physical layer 108. The SerDes GMAC 102, has a similar general GMAC 301, having a transmit MAC 303 and a receive MAC 302. The output of the transmit MAC is received by a module 305 that encodes data and sends the data to the SerDes module 109. The SerDes module send data to a module 304 that decodes data and sends the data to the receive MAC 302.

Figure 1:
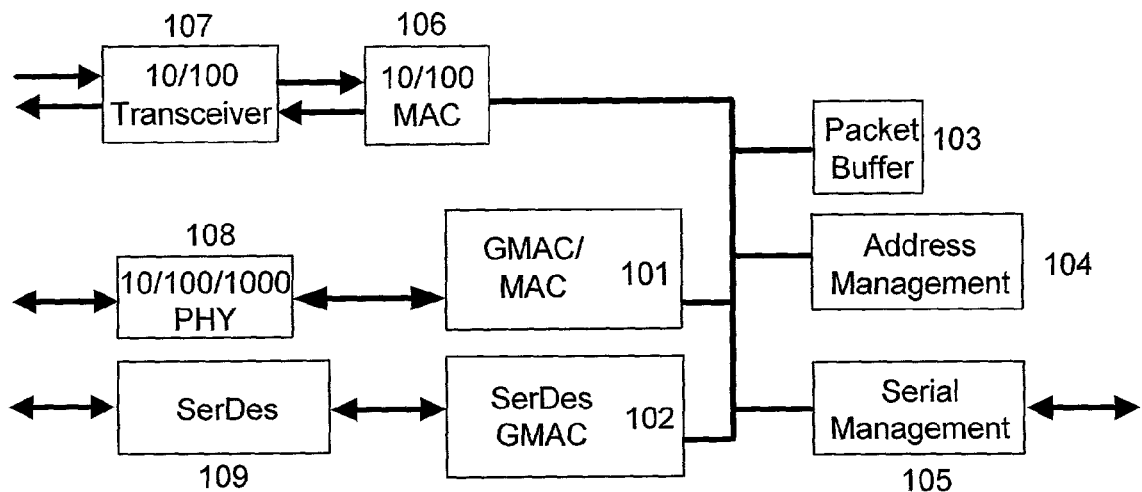
FIG. 1 illustrates a functional block diagram of portions of a network switch according to one embodiment of the present invention.

The 8+2 switch can also have a packet buffer 103, an address management module 104, as well as a serial management module 105, all illustrated in FIG. 1. It should be understood that the present invention is not limited to such an 8+2 switch, but the use of such a switch is important because it is just such types of switches that are often combined to provide a switch assembly with greater utility and port density.

Figure 3:
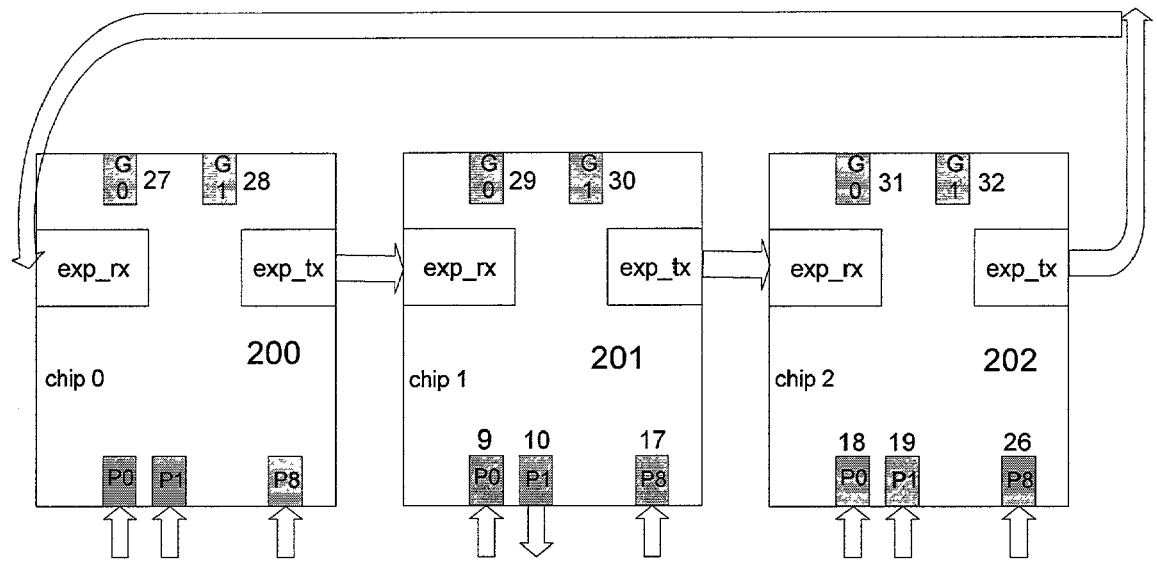
FIG. 3 illustrates an embodiment of a 24+6 system using three switches chained together.

Such a switch also has one expansion port so that we can chain the switches together to make a 16+4, a 24+6 or 36+8 system. FIG. 3 illustrates the chaining together of three switches or chips 200, 201 & 202, through their expansion ports to make a 24+6 system. Although the figure provides for such an interconnection through the illustrated ring structure, other interconnection schemes are also possible.

In order to support 24+2 wire speed transmission, at least 2.2 Gigabit/second is needed through the expansion ports. This requirement can be met through a "fat pipe", i.e. a wide interface, operating at a relatively slow speed or by using several channels at a Gigabit rate. It would be impractical to use a 16 bit bus running at 140 MHz in each direction. It is also not preferred to use a 32 bit bus running at 75 Mhz in each direction (i.e. 64 bit bus just for the expansion bus). In order to solve this problem, as discussed above, SerDes may be used as a physical layer media for cross chip communication.

The use of SerDes requires a lower pin count than the bus solutions and the wider buses also consume more power than use of the SerDes interface. However, that also requires overcoming several inherent problems.

SerDes is a module that provides fast serial communication between two chips. The general CMOS standard cell has difficulty driving a signal at speeds higher than 166 Mhz and usually has a very limited transmission distance. Because of the Digital Signal Processor (DSP) and analogy circuit design inside the Serdes module, it can drive signals across chips via PCB for long distances at 1 Gigabit per second.

Figure 4:
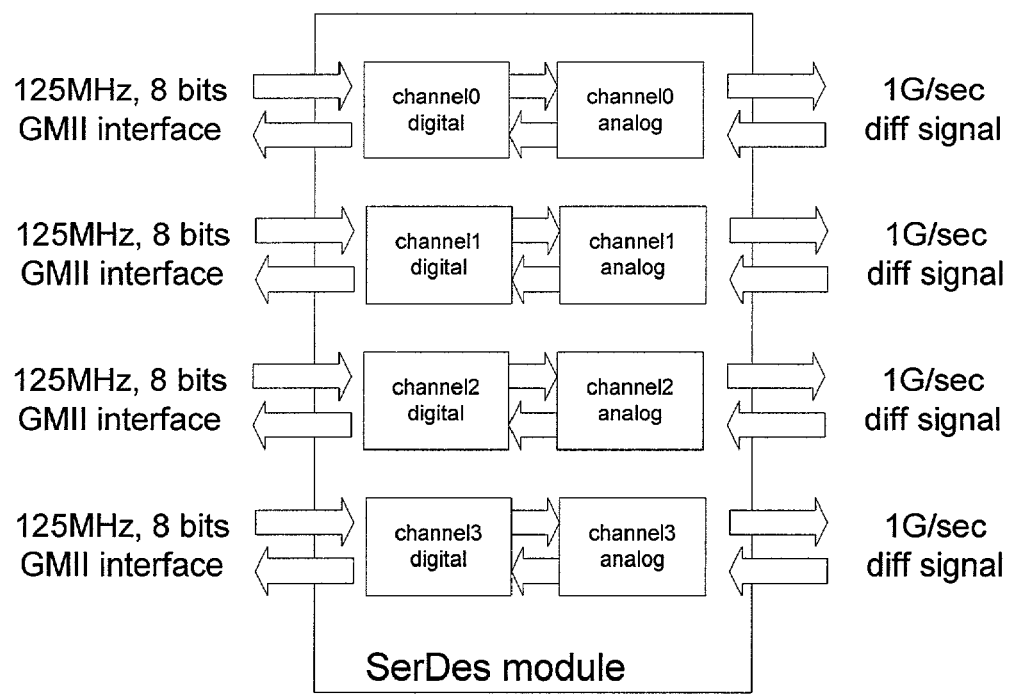
FIG. 4 illustrates a functional block diagram of a SerDes module.

SerDes modules operating a various speeds are generally available. With respect to the embodiment illustrated in FIGS. 1-3, a 1 Gigabit quad SerDes module is the most cost efficient solution. FIG. 4 provides a block diagram for SerDes module, according to one embodiment of the present invention. The SerDes module illustrated provides for four channels that send and receive data through the GMII interface and shuttle that data to and from the analog channels. The SerDes module takes 125 Mhz, 16 bit GMII interface signal and transfers the signal to 1 Gigabit per second differential pair signal. In order to provide the needed 2.2 Gigabit per second throughput, up to three 1 Gigabit per second SerDes channels must be used.

The GMII interface is a standard way for Gigabit MAC to interconnect with Gigabit PHY, and includes both transmit and receive sides. On the transmit side, the major related signals are tx_en, txd[7:0] and txclk, i.e transmission enable, transmission data and transmission clock. On the receive side, the major related signals are rx_dv, rxd[7:0] and rxclk, relating to the enable, transmission and clock on the receiving side. The GMII interface is provided in the IEEE802.3 standard and all specific details of the interface need not be restated herein.

Figure 5:
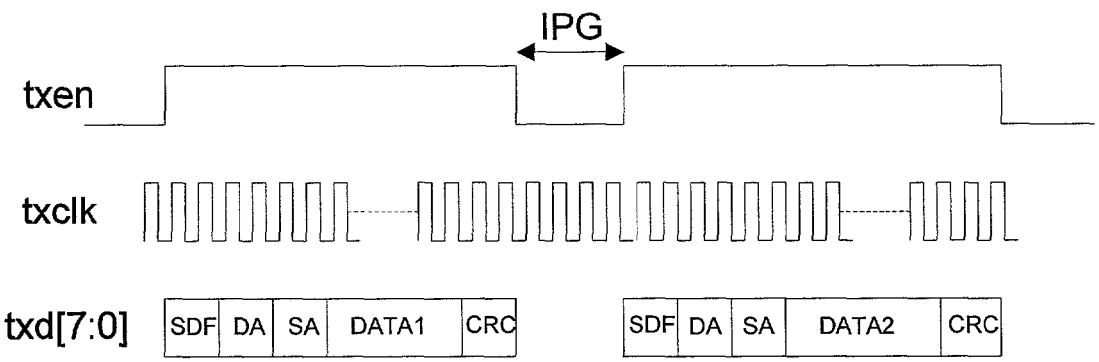
FIG. 5 illustrates the timing associated with the standard Gigabit Media Independent Interface (GMII)

The basic operation of the GMII interface is shown on the upper part of FIG. 5. Basically, txen is asserted when transmitting a frame. Together with txen, a Start of Delimiter Frame (SDF), as a identifier for the beginning of transmitting a frame, is transmitted. Then, the Destination MAC address (DA), followed by the Source MAC address (SA), is sent and then the data fields are sent. At the end of the frame, a Cyclic Redundancy Check (CRC) is attached to detect any data corruption. After that, it is necessary to wait for a 96 bit time before the next frame can be transmitted, to comply with the standard. This Inter Packet Gap (IPG) is necessary because the interface is connecting to a shared medium. Additionally, in full duplex, the internal First-In, First-Out (FIFO) of the PHY will be subject to jitter if the time of transmission is not limited.

In an embodiment, such as illustrated in FIG. 3, three SerDes channels are used as a layer 1 device to transmit a frame across the devices. The minimum frame size on expansion port of the individual switches is 64 byte. Since the frame on the expansion port has to be divided into three channels for such an embodiment, it will make the minimum frame side on the SerDes channel be 64/3 bytes. However, this violates the GMII standard, where the GMII standard requires 64 byte as the minimum frame side, and the SerDes module can not function properly under this situation.

One way to solve this problem is to change the minimum frame size to 64×3 bytes. However, this would require a FIFO that is 3 times larger to buffer these 64×3 data. This 3 times larger FIFO increases the cost and is not a favored solution. Actually, as is discussed below, there are other issued that are raised if the FIFO size is increased.

The other problem that needs to be addressed, concerns providing enough bandwidth across device. Without enough bandwidth across chip, it is impossible to make a wire speed 24+2 switch. Even if it were assumed that the extra cost for the larger FIFO were acceptable, the IPG constraint still creates bandwidth limitation issues. For each 64 byte frame sent, there is a wait of about 12 byte time for the IPG before the next frame can be transmitted. And during the transmission, the 8 byte SDF has to be sent before any data. So, the effective bandwidth for data transmission becomes:

$$64/(12+8+64)=0.76 \ G \ \text{bit/second} \quad (1)$$

When considering the overhead associated with data field, it is insufficient to use just three SerDes channels. Thus, in order to achieve the necessary transmissions, four SerDes channels would need to be used for just this purpose. However, this limits the overall usefulness of the SerDes module. One SerDes channel can be maintained for use with a fiber mode, but this would require an "extra" channel. Thus, if the inter-device communication can be achieved with only three channels, then the basic four channel SerDes can be used and cost savings can be achieved.

Figure 6:
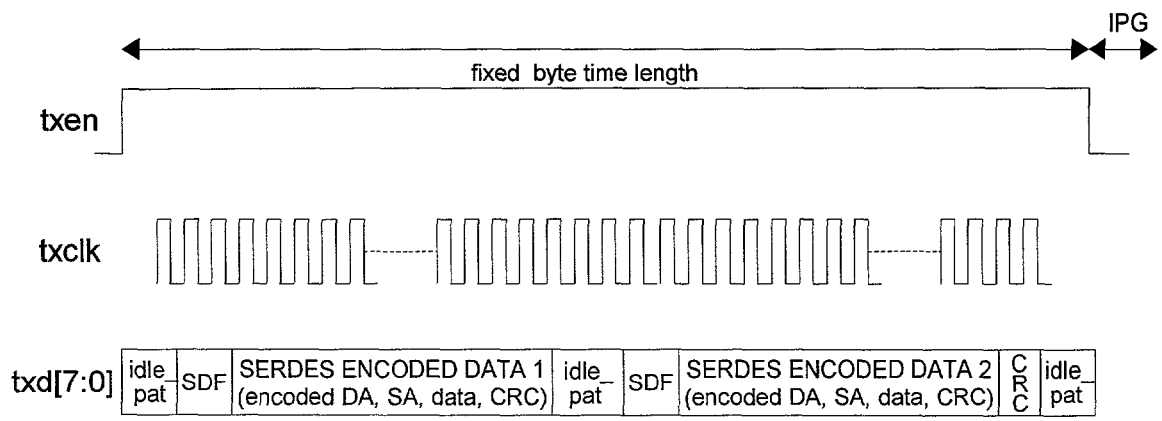
FIG. 6 illustrates the timing associated with a Gigabit Media Independent Interface (GMII) according to one embodiment of the present invention.

In the present invention, the above disadvantages are avoided by "pretending" that a frame is being transmitted across device continuously. Even when there is no frame data to transmit across the devices, the txen will be asserted and an idle pattern will be attached in the txd field to achieve a fixed byte time length. Such a protocol is illustrated in FIG. 6. This approach solves both the bandwidth and the minimum frame requirements discussed above.

Considering first the bandwidth requirement, in the present invention, a txen is asserted for a fixed period of time. The default period of asserting txen can be 1024 byte time, especially for the embodiment illustrated in FIG. 3. It can also be set as a 512 byte time or a 2048 byte time. The only time txen is not asserted is after the fixed period of time of txen. Thus, the effective bandwidth across is, for a fixed period of 1024 byte time:

$$1024/1024+12+8=0.981 \ G\text{bit/second} \quad (2)$$

This provides sufficient bandwidth across device for a switch assembly to become a wire-speed switch.

Secondly, this protocol does not violate the minimum frame requirement by this approach. From the SerDes point of view, the SerDes will always "think" that it is transmitting a 1024 byte frame continuously.

The above-discussed configuration of the invention is, in one embodiment, embodied on a semiconductor substrate, such as silicon, with appropriate semiconductor manufacturing techniques and based upon a circuit layout which would, based upon the embodiments discussed above, be apparent to those skilled in the art. A person of skill in the art with respect to semiconductor design and manufacturing would be able to implement the various modules, interfaces, and components, etc. of the present invention onto a single semiconductor substrate, based upon the architectural description discussed above. It would also be within the scope of the invention to implement the disclosed elements of the invention in discrete electronic components, thereby taking advantage of the functional aspects of the invention without maximizing the advantages through the use of a single semiconductor substrate.

Although the invention has been described based upon these preferred embodiments, it would be apparent to those of skilled in the art that certain modifications, variations, and alternative constructions would be apparent, while remaining within the spirit and scope of the invention. In order to determine the metes and bounds of the invention, therefore, reference should be made to the appended claims.

The invention claimed is:

1. A method for communicating data between network devices, said method comprising:
    sending a transmission signal over a port of one of said network devices, where said port is in communication with other network devices of said network devices; and
    sending a data frame over said port;
    wherein the transmission signal and the data frame are sent for a fixed byte time period and at least one idle pattern is included with the data frame when a time required to send all data present is less than the fixed byte time period.

2. The method for communicating data between network devices according to claim 1, further comprising sending a transmission clock over said port wherein the transmission clock is used to determine when the fixed byte time period has elapsed.

3. The method for communicating data between network devices according to claim 1, wherein the fixed byte time period is a 1024 byte time period.

4. The method for communicating data between network devices according to claim 1, wherein the fixed byte time period is a 512 byte time period.

5. The method for communicating data between network devices according to claim 1, wherein the fixed byte time period is a 2048 byte time period.

6. The method for communicating data between network devices according to claim 1, wherein an effective bandwidth across the network devices is 1 Gigabit per second.

7. The method for communicating data between network devices according to claim 1, wherein the step of sending a transmission signal over a port of one of said network devices comprises sending a transmission signal over a port of one of said network devices through a Gigabit media independent interface and the step of sending a data frame over said port comprises sending a data frame over said port through a Gigabit media independent interface.

8. The method for communicating data between network devices according to claim 7, wherein the step of sending a transmission signal over a port of one of said network devices comprises sending a transmission signal over a port of one of said network devices through a SerDes module that takes a signal from the Gigabit media independent interface and transfers the signal into a differential pair signal and the step of sending a data frame over said port comprises sending a data frame over said port through a SerDes module that takes a signal from the Gigabit media independent interface and transfers the signal into a differential pair signal.

9. A network device capable of communicating data between other network devices, said network device comprising:
    first sending means for sending a transmission signal over a port of one of said network device, where said port is in communication with the other network devices; and
    second sending means for sending a data frame over said port;
    wherein the first sending means and the second sending means are configured to send the transmission signal and the data frame for a fixed byte time period and the second sending means is configured to include at least one idle pattern with the data frame when a time required to send all data present is less than the fixed byte time period.

10. The network device according to claim 9, further comprising third sending means for sending a transmission clock over said port wherein the means for sending a transmission signal and the means for sending a data frame are configured to use the transmission clock to determine when the fixed byte time period has elapsed.

11. The network device according to claim 9, wherein the fixed byte time period is a 1024 byte time period.

12. The network device according to claim 9, wherein the fixed byte time period is a 512 byte time period.

13. The network device according to claim 9, wherein the fixed byte time period is a 2048 byte time period.

14. The network device according to claim 9, wherein the network device is configured such that an effective bandwidth across the network devices is approximately 1 Gigabit per second.

15. The network device according to claim 9, wherein the first and second sending means are configured to send the transmission signal and data frame through a Gigabit media independent interface.

16. The network device according to claim 15, wherein the first and second sending means are configured to send the transmission signal and data frame through a SerDes module that takes a signal from the Gigabit media independent interface and transfers the signal into a differential pair signal.

17. A network device capable of communicating data between other network devices, said network device comprising:
    at least one data port interface, supporting at least one data port transmitting and receiving data;
    at least one media access controller in communication with the at least one data port interface; and
    a SerDes module, that receives a signal from the at least one media access controller and transfers the signal into a differential pair signal;
    wherein the at least one media access controller is configured to employ a Gigabit media independent interface and the at least one media access controller and the SerDes module are configured to send a data frame for a fixed byte time period, where the data frame may include at least one idle pattern when a time required to send all data present is less than the fixed byte time period.

18. The network device according to claim 17, wherein said at least one data port interface comprises a first set of data port interfaces and a second data port interfaces, where the first and second sets of data port interfaces support transmitting and receiving data at different rates.

19. The network device according to claim 17, wherein said SerDes module includes four channels, with each of said four channels receiving a digital signal and transferring the digital signal into a differential pair signal.

20. The network device according to claim 17, further comprising at least one of a packet buffer, an address management module and a serial management module.

* * * * *